United States Patent
Almgren

(10) Patent No.: US 7,274,917 B2
(45) Date of Patent: Sep. 25, 2007

(54) METHOD AND SYSTEM FOR MANAGEMENT OF ROAMING MOBILE SUBSCRIBER

(75) Inventor: Fredrik Almgren, Stockholm (SE)

(73) Assignee: Smarttrust AB, Stockholm (SE)

( * ) Notice: Subject to any disclaimer, the term of this patent is extended or adjusted under 35 U.S.C. 154(b) by 188 days.

(21) Appl. No.: 10/534,676

(22) PCT Filed: Nov. 19, 2003

(86) PCT No.: PCT/SE03/01801

§ 371 (c)(1),
(2), (4) Date: May 12, 2005

(87) PCT Pub. No.: WO2004/047480

PCT Pub. Date: Jun. 3, 2004

(65) Prior Publication Data

US 2006/0003763 A1    Jan. 5, 2006

(30) Foreign Application Priority Data

Nov. 20, 2002 (SE) .................................. 0203438

(51) Int. Cl.
*H04B 1/18* (2006.01)

(52) U.S. Cl. .................................. 455/161.1; 455/432

(58) Field of Classification Search ............. 455/161.1, 455/432
See application file for complete search history.

(56) References Cited

U.S. PATENT DOCUMENTS

| 6,397,064 B1 * | 5/2002 | Bridges et al. .......... 455/432.3 |
| 2002/0102955 A1 * | 8/2002 | Bamburak et al. ....... 455/161.1 |

* cited by examiner

*Primary Examiner*—William D. Cumming
(74) *Attorney, Agent, or Firm*—Fasth Law Offices; Rolf Fasth

(57) ABSTRACT

The roaming of mobile equipment between a home network and foreign network is managed. The roaming behavior is based on the contents of control files saved in the mobile equipment of the subscribers. A list of networks to be used in a priority order in a roaming situation is defined in the control files. The management application checks the current roaming setting for the mobile equipment and the desired roaming behavior for the location that the mobile equipment roamed into. As a result of the comparison, the management application adjusts the roaming setting to be in accordance with the desired roaming behavior.

10 Claims, 2 Drawing Sheets

METHOD AND SYSTEM FOR MANAGEMENT OF ROAMING MOBILE SUBSCRIBER

PRIOR APPLICATIONS

Figure 1:
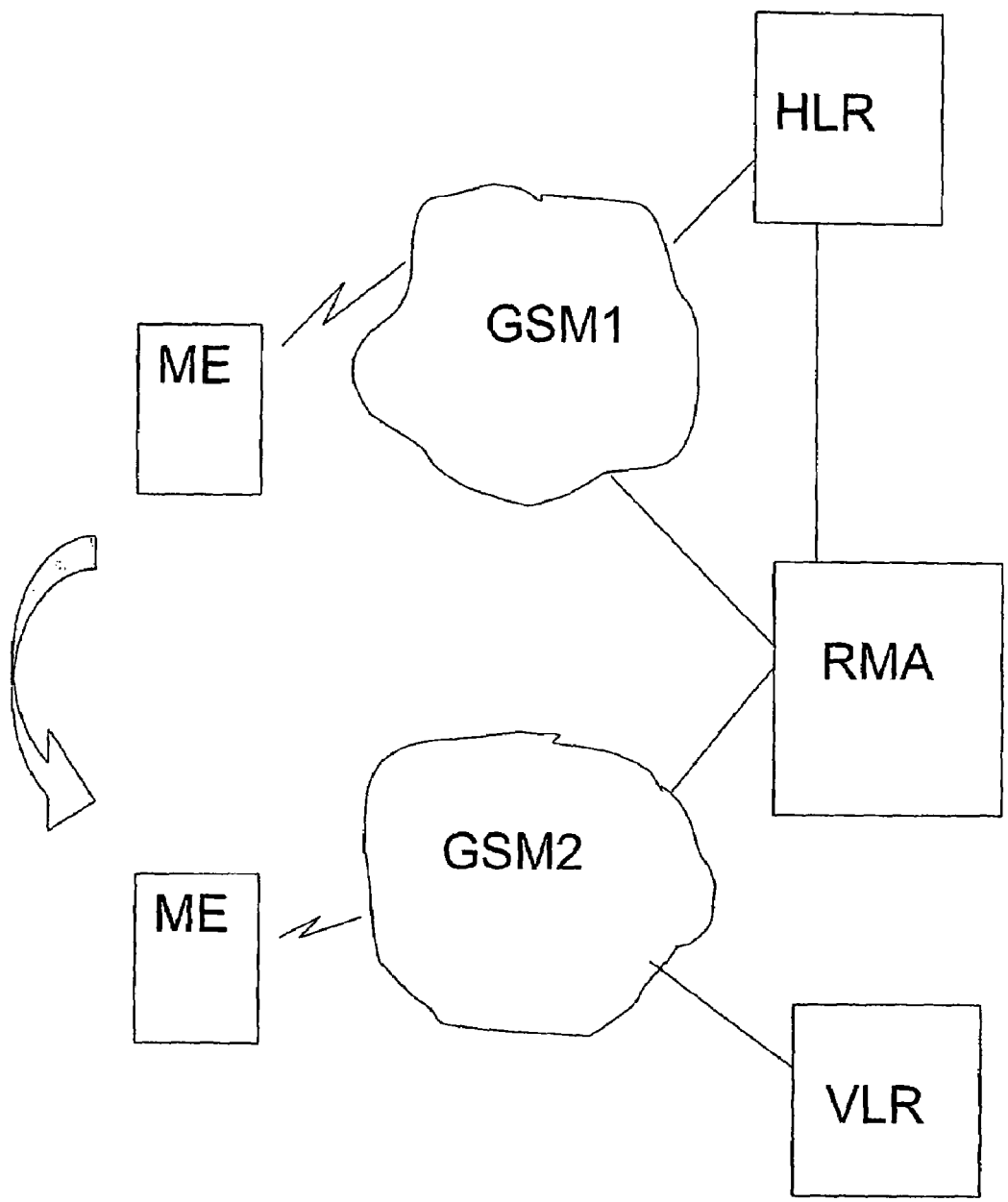

This is a US national phase patent application that claims priority from PCT/SE2003/001801, filed 19 Nov. 2003, that claims priority from Swedish Patent Application No. 0203438-7, filed 20 Nov. 2002.

TECHNICAL FIELD

The invention is concerned with a method and system for the management of roaming of mobile subscribers between the home network and foreign networks.

BACKGROUND ART

Roaming management covers the tools and processes used to control the roaming behavior for the subscribers in a mobile telecommunications network. When a subscriber leaves his home network and receives service from another network, he is said to be roaming.

A subscriber can roam to networks with which the operator of the subscriber's home network has a roaming agreement. Operators tend to have roaming agreements with as many other network operators as possible. However, the case is often that in any given roaming situation, there is one network that is preferred. This could be a network with which the operator has a better agreement and thus pays a lower price for its usage. It could also be a network that belongs to the same operator group as the home operator. The earnings for the subscribers' network usage would thus stay in the same company group if the subscriber could use the preferred networks as much as possible. If the roaming behavior could be efficiently controlled and the subscribers be made to roam into the most preferred network at any given time, large savings could be achieved for the operator. It shall, however, be noted that the opinion on which is the most preferred network may change over time.

Roaming management is thus an important area for the operators to improve the revenue stream. Roaming management gives the operator improved control of what networks its subscribers roam into when the home network can not be reached. Controlling this behavior becomes increasingly important as alliances are formed and the operator needs to manage this behavior on a continuous basis.

Roaming behavior is defined in the telecom standards and is controlled by data that is stored on the SIM (Subscriber Identity Module) card. The handset will modify its roaming behavior based on the contents of the roaming control files on the SIM card.

One such standard, in which the mechanisms that control roaming behavior in the GSM/3G network are defined is TS 23.122 in release 99 version. According to that standard, the roaming behavior is to a large extent controlled by two network selector files on the SIM card of the mobile phone. One of the files is the so-called subscriber-defined PLMN (Public Land Mobile Network) list and the other one is the operator-defined PLMN-list. Older versions of the standard define only one list.

When the phone shall select a network, it first looks for networks defined in the subscriber-defined list. Each network indicated by the subscriber-defined network selector file on the SIM is tried according to the priority order given in that file. If none of the networks listed in that file are possible to select, the phone tries the networks that are listed in the operator controlled network selector file. If still none of these are possible to select, the phone shall randomly chose a network whose signal strength exceeds a threshold value. In reality, this random selection often selects the strongest network. If none of the above methods have succeeded, the phone tries all other networks in order of decreasing signal strength. If the phone receives the information that a network is not allowed for roaming, the phone adds the network to the list of forbidden networks and will not access this network while the phone remains in automatic network selection mode.

However, once the phone is roamed into a network, it will stay on that network. According to the above standard, another file on the SIM shall control how often the phone searches for a higher preference network.

The phone will periodically search for the home network as well as a higher preference non-home network to roam into. Since this periodic network re-selection attempts only consider network of the same country as the network to which the phone is currently registered, the home network will only be attempted when the subscriber is nationally roamed.

The network selection functionality described above is the one defined in TS 23.122 in release 99 version. The functionality is, however, not yet fully implemented in most of the existing phones. This pertains especially to the periodic network re-selection attempts. It is anticipated that future phones will start to support these periodically performed attempts to find a higher preference network.

The fact that most phones do not yet support the periodic network re-selection means that once a phone registers to a non-preferred network, it has a tendency to remain there until something extra-ordinary, like coverage loss, takes place.

Even if the phone is turned off and on, the phone will remember the last network it was roamed onto and will try to go back to that network again by reading the information from the (Location Information) LOCI file on the SIM card. Thus the subscriber remains even longer than needed on the wrong network.

Only if coverage is lost, the phone will search for and switch to another network, which might be a preferred network if that network has coverage.

If no network has coverage, the phone will not be able to register to any network. If the coverage then returns, at the same time, for the previous network and a preferred network, the phone will still tend to register back onto the previous network.

There are a number of mechanisms that are employed today in order to control the roaming behavior as described above. Some of these are described in the following and the weaknesses or short-comings of these are touched upon. All descriptions given assume that the phone performs network selection without user interaction. When network selection takes places without user interaction, the phone is said to be operating in automatic network selection mode. If network selection is performed by the user, the phone is said to be operating in manual network selection mode. In manual network selection mode, it is in fact the subscriber that manually controls the roaming behavior. Consequences of being in manual network selection mode will be discussed further down in the document.

The most basic form of Roaming Management is to define the contents of the roaming control files, i.e. the PLMN list or lists and the network search period, on the SIM cards at the time of issuance. This becomes a static definition of preferred roaming networks.

An improvement to the static model is defined in the GSM 03.48 standard, in which the roaming control files are made updatable over the air. This enables remote update of the roaming control files when price models, agreements and operator constellations change. It is also possible to update the whole subscriber base in this manner. If the operator so chooses, it is possible to limit the group to subscribers that are likely to be roamers.

Due to the reasons described above, the handling of roaming control files as described above Is referred to as statistical roaming management since the statistical chance that a subscriber will register with a preferred network is greatly improved if the roaming control files are kept updated. The statistical roaming management thus controls roaming by updating the roaming control files on the SIM. Correctly used, the files can greatly improve the ratio of subscribers that roam into the preferred networks. However, there is never any guarantee that a subscriber will roam onto the preferred network.

The behavior of the statistical roaming management is non-intrusive for the subscriber. The effects are only that a preferred network is chosen initially at network selection or after the defined time period as described above. If no preferred network is present, the subscriber stays on the current network.

If the update of the roaming control files is made before the subscriber enters a roaming area, the phone will select the preferred network if it is present in the area. If the files are updated after the subscriber enters the roaming area, and the subscriber is in the wrong network, the subscriber is connected onto a preferred network only if a loss of coverage of the current network takes place and the preferred network is present.

Due to the above limitations, to the statistical roaming management, solutions for so-called dynamic roaming management exist. In some of these solutions, Dynamic Roaming Management uses active knowledge regarding a subscriber's roaming state and tries to achieve a change in the current roaming situation. In dynamic roaming management, the operator of a subscriber's home network knows when the subscriber roams into a new network. If that is an undesired network, a trigger is generated to a roaming server. The roaming server takes update measures towards the subscriber's SIM to make the phone select a better network. The dynamic roaming management is intrusive to the extent that since it attempts to perform an active task of moving the operator from one network to another.

In the dynamic roaming management scenario, a special roaming management application (RMA) monitors roaming events in the network, for example by interfacing to the HLR (Home Location Register). When the subscriber roams into a foreign network, the RMA is notified. If the subscriber roamed into a non-preferred network, attempts are made to dynamically move him to a preferred network. This behavior tends to lower the perceived quality of service for the subscriber and might therefore be undesirable from that aspect. Since the operator has a possibility of making money, a dynamic roaming management solution might be employed anyway.

Finally, it shall also be noted that the size of the roaming control file is always going to be limited. That means that it will never be possible to list all the preferred networks in this file.

THE OBJECT OF THE INVENTION

The object of the invention is to develop a dynamic roaming management method by avoiding the problems of prior art dynamic solutions.

SUMMARY OF THE INVENTION

In the method of the invention for the management of roaming of mobile subscribers, which are roaming between a home network and foreign networks, the roaming behavior is based on the contents of control files saved in the mobile equipment of the subscribers. A list of networks to be used in a priority order in a roaming situation is defined in said control files. When a subscriber is roaming from one network to another, information about the roaming Is sent to a roaming management application, which checks the current roaming setting for the subscriber and the desired roaming behavior for the location that the subscriber roamed into, and as a result of the comparison, when necessary, it adjusts the, roaming setting to be in accordance with said desired roaming behavior.

Optionally, the roaming management application changes the network search time interval depending on whether the subscriber roamed to a preferred or a non-preferred network.

Preferable embodiments of the invention are described in the following.

The invention is especially meant to be used in connection with the standardized content files stored in the Subscriber Identity module (SIM) of the mobile equipment in a 3G/GSM network.

This invention concerns a concept that has been named "dynamic hybrid roaming management". The idea is to develop the possibilities discussed above and improve the total solution. Since the type of dynamic roaming behavior described above tends to be intrusive, the basic idea lies on leveraging a new method for a statistical roaming management. As time passes by, more and more phones are likely to support the newer version of the standard mentioned above. In that case, the system can trust those phones to revert to a preferred network after a limited time.

The information about the roaming is sent to a roaming management application in the form of roaming triggers from the network in the same way as in the dynamic prior art solution. These triggers can come from an HLR or another suitable network component. Alternatively, they are sent from the SIM or from an application on the SIM.

When the roaming management application (RMA) receives the trigger, it checks whether the subscriber just roamed onto a preferred network. If the subscriber roamed into a non-preferred network, the RMA checks which network is preferred and updates the control files accordingly by writing the preferred network into the list of networks and also by possibly lowering the time limit that controls how often the phone shall look for a preferred network. The RMA notes that it has performed a roaming control action for this subscriber. It then trusts the phone to switch to the correct network by itself the next time a network search is done.

The functionality is possible to extend with an equipment database where IMEI (International Mobile station Equipment Identity) or IMEISV (International Mobile station Equipment Identity and Software Version Number) are used to identify the phone. This database provides the RMA with information as to whether the phone supports the roaming behavior of the invention by connecting terminal capability information to the terminal identity and software versions. If not, it is possible for the server to revert to the old style dynamic roaming as defined in background art section. If the IMEI/IMEISV indicates that the phone does support correct roaming behavior, RMA will not perform old-style roaming management.

If the subscriber roams into a preferred network, the RMA can see if it recently performed a management action towards that subscriber. If that is the case, the time period might be reset to a higher value again, i.e. the time interval for the network search is extended.

Furthermore, based on what country the subscriber is roaming in, it is possible to update the roaming control network list on the SIM with specific networks that shall be activated when a subscriber roams to the current country. An example is that the preferred networks of the neighboring countries can be added, according to definitions made by the operator. In this manner, roaming can be pro-actively used based on location, neighboring countries as well as subscriber specific usage patterns.

The described method also overcomes the problem of the limited size of the network lists by using it dynamically. It also removes the need of updating subscribers that might not be roaming, because only roamers need to be updated.

In a world where more and more handsets become compliant to the above standards, the mechanisms described above as statistical and dynamic roaming management can be combined so that the hybrid roaming management solution of the invention can be used in all mobile phones.

The hybrid solution of the invention uses only the non-intrusive mechanisms that form the basis for the statistical roaming management. The basis is thus to ensure that SIM cards initially are either pre-personalized or personalized at point-of-sale with correct roaming control files. On top of that, remote update of roaming control files is employed as alliances form and so on.

Since a standard compliant phone does not need to be forced over to an alternate network, there is no need for the intrusive mechanisms normally used in dynamic roaming management. Instead the dynamic aspect can be used in a smarter manner.

Since the file sizes for the files that define preferred networks on the SIM are limited, it might not be possible to list every preferred network in these files. So the focus for initial personalisation of the data would be to cover most cases by a having a good initial list and to keep this updated.

When the network gets a trigger, or such a trigger is generated from the SIM-card, that a subscriber has roamed into an undesired network, it sends this information to the roaming server running a roaming management application. The roaming management application checks the system image of the subscriber's roaming control files.

If the image shows that the subscriber already has the preferred network, or networks, for the present country defined, no action would be taken. The system can assume that a best effort has already been made by the mobile to find the preferred network. Since that failed, the preferred network is probably not present. The handset will periodically attempt to find the preferred network.

If the system shows that the subscriber does not have the appropriate definition for preferred networks for the country where he currently is, the system will perform an update of these roaming control files. When the search period completes, the handset will search for the newly defined preferred network. Once again, the roaming management would operate unobtrusively for the subscriber.

In the following, the invention will be described by means of some preferred examples by means of figures. The invention is not limited to the details of the following presentations.

FIGURES

FIG. 1 is a view of the environment, wherein the invention can be used.

Figure 2:
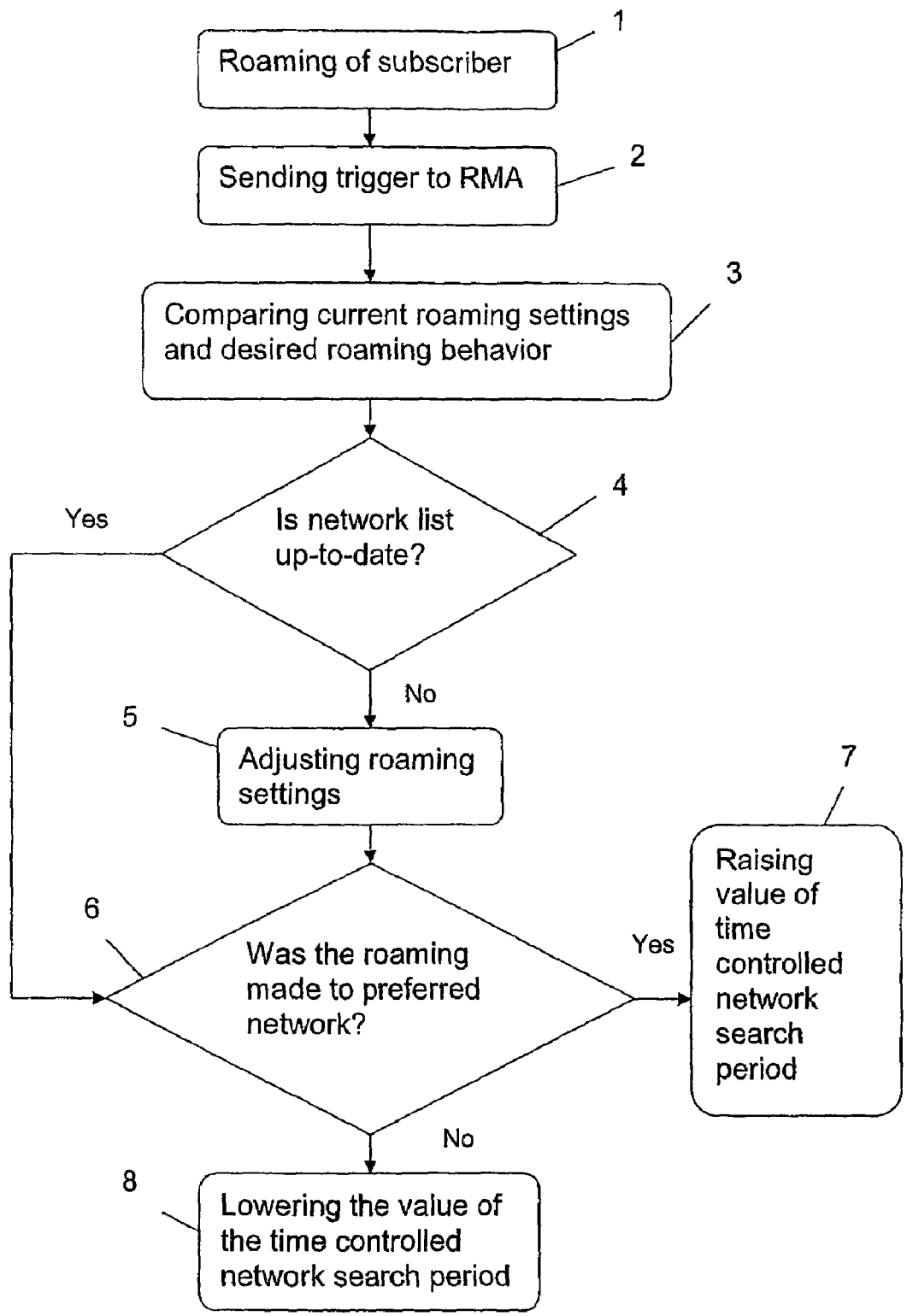

FIG. 2 presents a flow scheme of the method of the invention

DETAILED DESCRIPTION

FIG. 1 presents a scenario, wherein a mobile subscriber with the mobile equipment ME moves from a first network GSM1 to another GSM2. In this embodiment, GSM1 is assumed to be the home network even if the invention equally well can be applied in a situation wherein the subscriber moves from one foreign network to another. HLR is the home location register of subscribers belonging to network GSM1. The method of the invention is applied in a situation, wherein roaming of the ME from GSM1 to GSM 2 takes place, which is indicated with an arrow in FIG. 1.

The HLR is always aware of in which network the subscribers are. The roaming is managed by a roaming management application in a roaming server, which gets the information about the roaming situations of subscribers from e.g. the HLR.

When the ME has entered a new, foreign network GSM2, the subscriber is registered in the Visitor Location Register (VLR) of the foreign network and the HLR of the network GSM1 is updated. The HLR can now send the roaming trigger to the RMA. The roaming trigger could also be generated from another origin.

FIG. 2 presents an overall flow scheme of the method of the invention. The SIM card of a subscriber has a roaming control file that defines a list of networks to be used in a priority order in a possible roaming situation. When the subscriber roams from one network to another (step 1 of FIG. 2) he is connected to a network with the highest possible preference in said list. This means that the network with the highest priority is tried first and if that network is not available, the next network in the list is tried and so on until a connection is achieved. The Home Location Register (HLR) immediately gets information of the roaming after which a trigger is sent to a Roaming Management Application (RMA) situated in the roaming server (Step 2 of FIG. 2). The RMA now checks the current roaming setting (the priority list of networks) for the subscriber and compares it to the desired roaming behavior parameters for the location that the subscriber roamed into (in step 3 of FIG. 2).

RMA has fresh information about what network the operator desires to be chosen in roaming situations. If step 4 of FIG. 2 shows that the network priority list was not up-to-date for the given subscriber, and the desired roaming settings thus differed from the actual roaming settings, RMA adjusts the roaming settings (step 5 of FIG. 2) to be in accordance with the desired behavior by looking at subscriber related knowledge on how to adjust the roaming settings. If the actual roaming settings and the desired roaming settings were identical, the settings do not need to be adjusted and, the process can directly proceed with step 6.

If the roaming, in fact, was made to the correct network (which is stated in step 6 of FIG. 2), RMA might, in the optional step 7 raise the value of the time controlled network search period so that the search for a higher preference network is not perfomed as often (step 7 of FIG. 2). Analogously, it might lower the value of the time controlled network search period so that the search for a higher preference network takes place more often (step 8 of FIG. 2) if the roaming was not made to the correct network (which is stated in step 6 of FIG. 2).

As an optional step, the value of the time controlled network search period can be raised if the current roaming setting for the subscriber and the desired roaming behavior for the location that the subscriber roamed into were identical.

As a still optional step, the RMA might after step 3 of FIG. 2 check if the phone supports the roaming behavior as defined in TS 23.122 release 99. If not, RMA may apply old-style roaming statistic or dynamic management for that subscriber.

The described solution combines the positive parts of the old-style dynamic roaming and the statistical roaming. When compared with the old-style dynamic roaming, the proposed solution behaves in a non-intrusive way for the subscriber. The proposed solution still covers the need expressed by the old style dynamic roaming management by allowing the behavior to be controlled by terminal capabilities in the system database by usage of IMEI/IMESV. This enables the proposed solution to choose the best method for the terminal in question.

Compared to the existing statistical roaming management, it reduces the amount of network traffic by updating the subscribers that really do roam rather than a batch of subscribers that might not be roaming.

By the dynamic behavior of the solution it also makes efficient usage of the network lists on the SIM by tailoring its contents to the regional area where the subscriber currently resides.

The system can be further refined by making use of more specific location information to base the behavior on where in a specific network the subscriber currently is.

The invention claimed is:

1. A method for the management of roaming of mobile subscribers roaming between a home network and foreign networks, in which method the roaming behavior is based on the contents of control files saved in the mobile equipment of the subscribers, comprising:
    a) defining a list of preferred networks into a control file of the mobile equipment of a subscriber to be used in a priority order in a roaming situation,
    b) the mobile equipment roaming from one network to another,
    c) sending information about the roaming to a roaming management application,
    d) upon receipt of the information about the roaming from the mobile equipment, the roaming management application comparing a current roaming setting of the mobile equipment and a desired roaming behavior for the mobile equipment at application when the mobile equipment has roamed into the location,
    e) the roaming management application determining whether the list of preferred networks in the control file is updated in accordance with the desired roaming behavior for the mobile equipment when the mobile equipment is at the location,
    f) when the list of preferred networks in the control file is not updated in accordance with the desired roaming behavior for the mobile equipment when the mobile equipment is at the location, the roaming management application dynamically updating the list of preferred networks in the control file in accordance with the desired roaming behavior, and
    g) when the list of preferred networks in the control file is updated, the roaming management application determining whether the subscriber roamed into a preferred network in accordance with the desired roaming behavior for the location of the mobile equipment.

2. The method of claim 1, the method further comprises the step of changing a time controlled network search period.

3. The method of claim 2, wherein a value of the time controlled network search period is raised if the roaming was made in accordance with the desired behavior for the location that the the mobile equipment roamed into.

4. The method of claim 2, wherein a value of the time controlled network search period is lowered if the roaming was not made in accordance with the desired behavior for the location that the mobile equipment roamed into.

5. The method of claim 1, wherein the content files are stored in a Subscriber Identity module (SIM) of the mobile equipment.

6. The method of claim 1, wherein information is sent from a Home Location Register (HLR).

7. The method of claim 5, wherein information is sent from the SIM or from an application on the SIM.

8. The method of claim 1, wherein the method further comprises the roaming management application checking if the phone support the desired roaming behavior.

9. The method of claim 8, wherein the roaming management application applies roaming statistic or dynamic management for a subscriber, whose equipment does not support the desired roaming behavior.

10. A system for the management of roaming of mobile subscribers roaming between a home network and foreign networks, comprising:
    a mobile subscriber equipment having control files stored therein, the control files having contents that decides a roaming behavior by means of a list of networks to be used in a priority order in a roaming situation, and
    a roaming management application with means for handling roaming information received from the mobile subscriber equipment;
    means for comparing a current roaming setting for the mobile subscriber equipment with a desired roaming behavior, included in the roaming information, for a location to which the mobile subscriber equipment roamed to; and
    means for dynamically updating the control files of the mobile subscriber equipment on the basis of a desired roaming behavior for the location of the mobile subscriber equipment.

\* \* \* \* \*